Patented Oct. 16, 1951

2,571,716

UNITED STATES PATENT OFFICE 2,571,716

REACTION PRODUCT OF PHTHALIC ANHYDRIDE AND A PRIMARY ROSIN AMINE

Frederick G. Hess, Merchantville, N. J., assignor, by mesne assignments, to Cities Service Research and Development Company, New York, N. Y., a corporation of New Jersey No Drawing. Application December 12, 1947, Serial No. 791,464

7 Claims. (Cl. 260—100)

This invention relates to synthetic resins and more particularly to the preparation of a group of new phthalamide resins.

It has been found that compounds showing high promise as synthetic resins for a number of purposes may be prepared by the reaction of phthalic anhydride with rosinamines prepared from special grades of modified rosin, and having generally the structure of amino-methyl-isopropyl derivatives of phenanthrene, of various degrees of saturation.

The end products obtained are clear, smooth, light yellow nontacky resins which are wholly insoluble in water, and yet may readily be dissolved in such common solvents as Stoddard, xylene, naphtha, gasoline, ethanol, benzol, and the like. The resins have excellent covering power, forming highly tenacious films which are capable of excluding both water and air, and have other properties which fit them for use in the sizing of paper, and the preparation of coating compounds for metal, and for other uses.

The products may be variously prepared. When rosinamine is reacted in equimolar quantities with phthalic anhydride at a temperature of the order of 230° F. a monoamide is formed. If the reaction is carried out at a temperature of the order of 300° F., water will be split off, with the consequent formation of an imide. By reacting two mols of rosinamine with one mol of phthalic anhydride, a diamide may be obtained. The foregoing products are clear, yellow, fairly brittle resins. In order to render them useful as coating compositions it is generally desirable to add plasticizers such as ethyl cellulose, paraffin wax, or tricresyl phosphate. It has been found that the addition of from 0.5 to 1.5 per cent of ethyl cellulose and from 0.2 to 0.5 per cent of paraffin wax to a 20 per cent solution of the compounds in xylene is sufficient to produce a tough, resistant film when the solution is applied to metal objects and allowed to dry. Tricresyl phosphate may also be added in proportions ranging from 0.1 to 0.5 per cent.

The monoamide may be treated with an excess of a base such as a calcium hydroxide to form a metal salt. The product from this reaction is a light yellow, nontacky, fairly tough resin which does not need the addition of plasticizers to fit it for use.

The products when used as coating compounds are dissolved, together with any necessary plasticizer, in solvents such as xylene or Stoddard solvent in concentrations of from 3 to 40 per cent and the articles to be treated are dipped in the solution or printed with the solution. Upon evaporation of the solvent a tough nontacky film which is impervious to air, water vapor, or sulphur oxides in the air will completely coat the treated article, thus effectively protecting it from corrosion or tarnishing, the thickness of the film depending on the concentration of the solution.

The nature of the new resins, their more important physical characteristics and at least one method by which they may be prepared will be illustrated in the following examples:

Example I

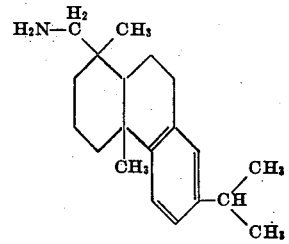

A compound was prepared by the reaction of one mol of an unsaturated rosinamine having a theoretical formula as above with one mol of phthalic anhydride. 46.5 grams of the rosinamine and 21.6 grams of phthalic anhydride were stirred together in 100 cc. of xylene until all the phthalic anhydride was dissolved. The solution was then heated at 230° F. until the reaction was completed. A light yellow solution was obtained, which did not separate on standing in the light. The product was recovered from a portion of the solution and was found to be a yellow, nontacky, fairly brittle resin. The balance of the solution was then diluted with xylene to make a 20 per cent solution, which was blended with 1 per cent by weight of ethyl cellulose and 0.2 per cent by weight of paraffin wax, calculated on the total weight of the solution.

It was found that when this solution was applied to metal articles a clear yellow film was deposited on the articles after evaporation of the solvent, which film was of a tough nontacky character and effectively protected the coated articles against oxidation or tarnishing over considerable periods of time.

Example II

This product was obtained by dissolving equimolar weights of the rosinamine of Example I and phthalic acid in xylene and then heating under reflux at a temperature of approximately 300° F. 46.5 grams of the rosinamine and 21.6 grams of phthalic anhydride were dissolved in 100 cc. of xylene. The mixture was then heated under reflux at approximately 300° F. until the reaction was completed, the water split off during the reaction being trapped. A resin having the same general characteristics as that of Example I was recovered from a portion of the solution.

The balance of the solution was then diluted with xylene to make a 20 per cent solution, and 1 per cent by weight of ethyl cellulose and 0.2 per cent of paraffin was added. This solution, when applied to metal objects, after drying, formed a light yellow resinous protective coating which is tough, durable, transparent, and nontacky.

Example III

The mono-amine of phthalic acid in solution in xylene produced by the method of Example I was heated with an excess of calcium hydroxide under reflux until the reaction was complete, the water formed being trapped out during the heating. It was found that the solution of calcium salt of phthalic acid mono-amine thus formed, when diluted with Stoddard solvent to a concentration of only 3 per cent of calcium salt in the solution, produced a clear, smooth, nontacky film when applied to metal objects, that the film was essentially nonreactive with the metal objects, and served to protect them from oxidation or tarnishing for considerable periods of time.

Example IV 46.5 grams of the rosinamine of Example I and 10.8 grams of phthalic anhydride were dissolved in a xylene solution and heated under reflux at a temperature of approximately 230° F. until the reaction was completed, trapping out the water which was formed during the reaction. A light yellow resin very similar to the product of Example I was recovered. The product was dissolved in xylene to a 20 per cent solution and 1 per cent of ethyl cellulose and 0.2 per cent of paraffin wax was added. When this solution was applied to metal objects, a clear, tough, nontacky film was formed upon evaporation of the solvent.

Example V

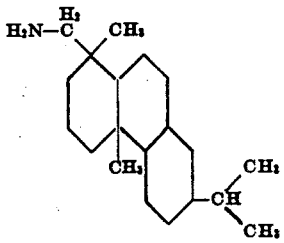

The reactions of the four foregoing examples were repeated, using a saturated rosinamine of a theoretical formula as shown above in place of the unsaturated rosinamine previously used. It was found that the resultant products were resins very similar in appearance and characteristics to the foregoing products, and could be used for the same purposes.

It will be appreciated that the exact structure of the primary rosinamines used as starting materials, their degree of saturation, and the number and location of the methyl and isopropyl groups will vary according to the modified rosin from which they are derived. The structures given above merely exemplify the general structure of the rosinamines. Commercial grades of rosinamines generally contain about 85 per cent to 95 per cent rosinamine, the balance being impurities, mainly saturated neutral oils resulting from the decarboxylation of resin acids and the normal nonacid constituents of refined wood rosin. The presence of these impurities does not appear to affect adversely the process described above, nor do the impurities appear to affect adversely the quality of the final reaction product.

All the compounds prepared by me gave light yellow colored solutions in xylene, Stoddard, naphtha, gasoline, ethanol, benzol, and like solvents, and did not separate from solution upon standing in the light. They are all insoluble in water, and may be used as coatings to prevent the access of water to coated objects, and for other uses in which a water resistant film is desired.

It was found that coatings resulting from these solutions will remain unbroken, neither checking nor cracking under extreme temperature changes, and will completely protect the bright polished surfaces of steel, bronze, brass, or aluminum objects for many months. When using the calcium salts of the amide compounds described above it was found that as little as 3 per cent of the compound in a solution of Stoddard solvent would afford adequate protection.

It will be apparent that the described compositions have the virtue of low cost, fairly high volatility, and a flash point which is high enough to avoid undue fire hazard. They will adhere to common metals of construction, are completely waterproof, and are essentially nonreactive with the metals to be coated. In addition, they are easily stripped from the coated article when it is desired to use the same, and when stripped, the article will be found to be in factory fresh condition. The coated articles may be stripped by dipping them in Stoddard solvent or xylene or other commercial solvents in order to dissolve the protective coating on their surface. It will be obvious that the resinous coating material may be recovered by concentration of the solution and reused in coating additional articles. Thus there is no loss of material and the original resin may be used over and over again thereby effecting a desirable economic result.

Having described my new compounds and one, though not necessarily the only, method by which they may be prepared, what I claim as new and useful is:

1. As a new composition of matter, the amide which is the reaction product of phthalic anhydride and an amine selected from the group consisting of rosinamine, dehydrorosinamine, and dihydrorosinamine, in the proportions of about one mol of phthalic anhydride to from about one to about two mols of the amine.

2. The composition according to claim 1 in which the phthalic anhydride and the amine are reacted in equimolar proportions.

3. As a new composition of matter, the calcium salt of the composition of claim 2.

4. As a new composition of matter, the reaction product of phthalic anhydride and a primary rosinamine having the following formula:

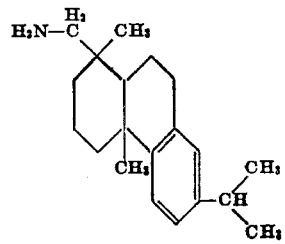

5. As a new composition of matter, the reaction product of phthalic anhydride and a primary rosinamine having the following formula:

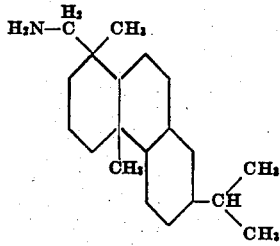

6. As a new composition of matter, the calcium salt of the reaction product of equimolar quantities of phthalic anhydride and a rosinamine having the following formula:

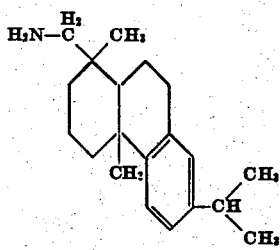

7. As a new composition of matter, the calcium salt of the reaction product of equimolar quantities of phthalic anhydride and a rosinamine having the following formula:

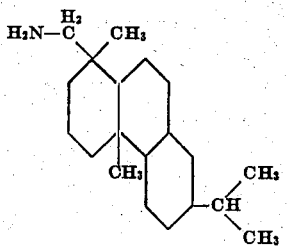

FREDERICK G. HESS.

REFERENCES CITED

The following references are of record in the file of this patent:

UNITED STATES PATENTS

| Number | Name | Date |
| --- | --- | --- |
| 2,123,246 | Koeberle et al. | July 12, 1938 |
| 2,138,137 | Bowlby | Nov. 29, 1938 |
| 2,138,211 | Schnorf | Nov. 29, 1938 |
| 2,165,515 | Schmidt | July 11, 1939 |
| 2,234,565 | Lanning | Mar. 11, 1941 |
| 2,306,887 | Klose | Dec. 29, 1942 |
| 2,307,097 | Anderson | Jan. 5, 1943 |
| 2,319,696 | Littman | May 18, 1943 |
| 2,326,812 | Wiggam | Aug. 17, 1943 |
| 2,413,011 | Traylor | Dec. 24, 1946 |